(12) United States Patent
Birman et al.

(10) Patent No.: US 9,589,677 B2
(45) Date of Patent: Mar. 7, 2017

(54) STEPPER POINTER

(71) Applicant: Continental Automotive Systems, Inc., Auburn Hills, MI (US)

(72) Inventors: Vyacheslav B. Birman, Auburn Hills, MI (US); Richard Daniel Sanders, Clarkston, MI (US); Guoqing Wang, Rochester Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 327 days.

(21) Appl. No.: 14/499,808

(22) Filed: Sep. 29, 2014

(65) Prior Publication Data
US 2016/0093405 A1    Mar. 31, 2016

(51) Int. Cl.
| | |
|---|---|
| *G12B 11/04* | (2006.01) |
| *G01D 13/26* | (2006.01) |
| *G01D 13/28* | (2006.01) |
| *B60K 35/00* | (2006.01) |
| *B60K 37/00* | (2006.01) |
| *B60K 37/02* | (2006.01) |

(52) U.S. Cl.
CPC .............. *G12B 11/04* (2013.01); *B60K 35/00* (2013.01); *B60K 37/00* (2013.01); *B60K 37/02* (2013.01); *G01D 13/265* (2013.01); *G01D 13/28* (2013.01)

(58) Field of Classification Search
CPC ...... G01D 13/22; G01D 13/265; G01D 13/28; B60K 35/00; B60K 37/00; B60K 37/02; G12B 11/04

USPC .................... 116/284–288, DIG. 6, DIG. 36
See application file for complete search history.

(56) References Cited

U.S. PATENT DOCUMENTS

| | | | | |
|---|---|---|---|---|
| 5,458,082 A | * | 10/1995 | Cookingham | B60Q 3/004 116/288 |
| 5,603,283 A | * | 2/1997 | Owen | G01D 11/28 116/284 |
| 5,842,435 A | * | 12/1998 | Tsukamoto | G01D 13/28 116/26 |
| 6,302,055 B1 | * | 10/2001 | Kalashnikov | G01D 11/28 116/286 |
| 6,959,995 B2 | * | 11/2005 | Ikarashi | G01D 11/28 116/47 |
| 7,270,434 B2 | * | 9/2007 | Obata | G01D 11/28 362/23.13 |
| 7,592,972 B2 | | 9/2009 | Eckardt et al. | |
| 8,261,686 B2 | | 9/2012 | Birman et al. | |
| 2014/0165904 A1 | | 6/2014 | Birman et al. | |

FOREIGN PATENT DOCUMENTS

| | | | | |
|---|---|---|---|---|
| EP | | 2587121 A1 | 5/2013 | |
| FR | EP | 0497664 A1 * | 8/1992 | ............ G01D 13/28 |
| WO | WO | 2008134477 A2 * | 11/2008 | ............ G01D 11/28 |

* cited by examiner

*Primary Examiner* — Laura Martin
*Assistant Examiner* — Irving A Campbell

(57) ABSTRACT

A gauge assembly which has a gauge surface including graphics representing a vehicle operating parameter. A pointer arm is provided which is made out of a light guide or light transmitting material. The pointer arm includes a step portion in an operative portion of the second bottom surface for reducing light received by said second surface adjacent the step portion and providing an overall even light throughout the operative illuminated viewing surface of the pointer arm.

23 Claims, 3 Drawing Sheets

STEPPER POINTER

FIELD OF THE INVENTION

The present invention relates to vehicle instrument panels and clusters, and more specifically to a pointer for a gauge that includes features providing improved illumination characteristics.

BACKGROUND OF THE INVENTION

Vehicles include instrument panels to communicate information indicative of operation to an operator. Motor vehicles include instrument panels with several gauges and dials that communicate vehicle conditions such as speed, engine rpm, temperature, oil pressure along with many other operational parameters. A pointer is typically provided that rotates about a fixed axis that points to value on the gauge face to communicate current values of an operational parameter. Pointers are often illuminated to further enhance visibility and appearance. Light sources that direct light along the axis or rotation can cause a bright spot at the axis on the pointer.

The geometry of the pointer including relative angles and widths between surfaces of the pointer provide a means of uniformly propagating light from a hub to a pointer tip. The size and shape of a pointer is limited by manufacturing practicalities such as possible mold draft angles. As an example, a solution to this problem is taught in my co-pending, commonly assigned Patent Application No. US2014/0165904A1 (incorporated herein by reference hereto). While this effectively solves the problem by using a reverse slope on the bottom of the pointer near the axis of the pointer and this provides substantially uniform illumination, the reverse slope type arm has proven troublesome in manufacturing.

Accordingly, it is desirable to design and develop a pointer that provides uniform illumination within manufacturing capabilities that increases an area in which luminance may be evenly distributed.

SUMMARY OF THE INVENTION

The subject invention provides a gauge assembly which has a gauge surface including graphics representing a vehicle operating parameter. A pointer is provided which is made out of a light guide or light transmitting material. The pointer is supported for movement about an axis to indicate a current condition of the vehicle operating parameter by pointing to a specific location on the gauge surface. The pointer has a pointer arm extending away from a hub of the gauge assembly. An illumination source is provided for illuminating the pointer arm. The pointer arm includes a reflecting surface at a portion on a first end of the pointer opposite a pointing end. The reflecting surface reflects light received from the illuminating source into the length of said pointer arm. The pointer arm also includes a first illuminated viewing surface and a second bottom surface to which light from said reflecting surface is at least partially reflected toward the illuminated viewing surface. The second surface including a step portion in an operative portion of the second surface for reducing light received by said second surface adjacent the step portion and providing an overall even light throughout the operative illuminated viewing surface.

The step portion in the second surface generates a substantially uniform luminance over a larger area and pointer length by reducing a portion of the reflected light to the second surface. The step portion also allows a closer radius of useful pointer light in the gauge.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
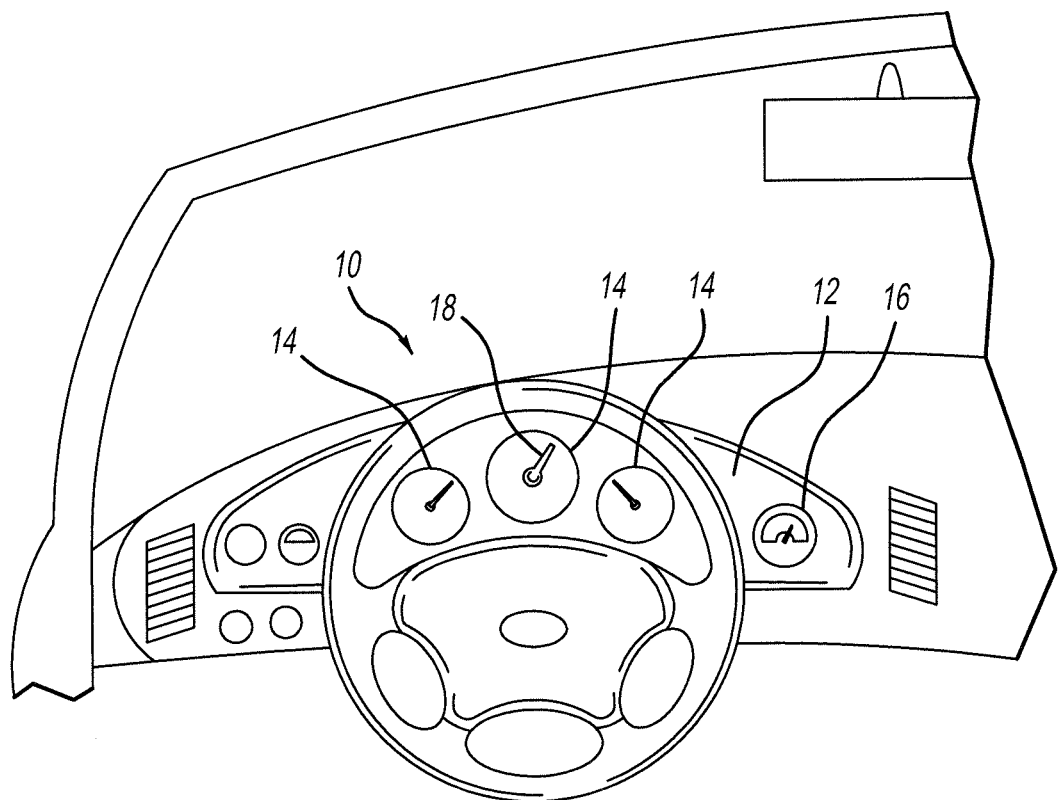
FIG. 1 is a schematic view of an example instrument panel for a motor vehicle.
Figure 2:
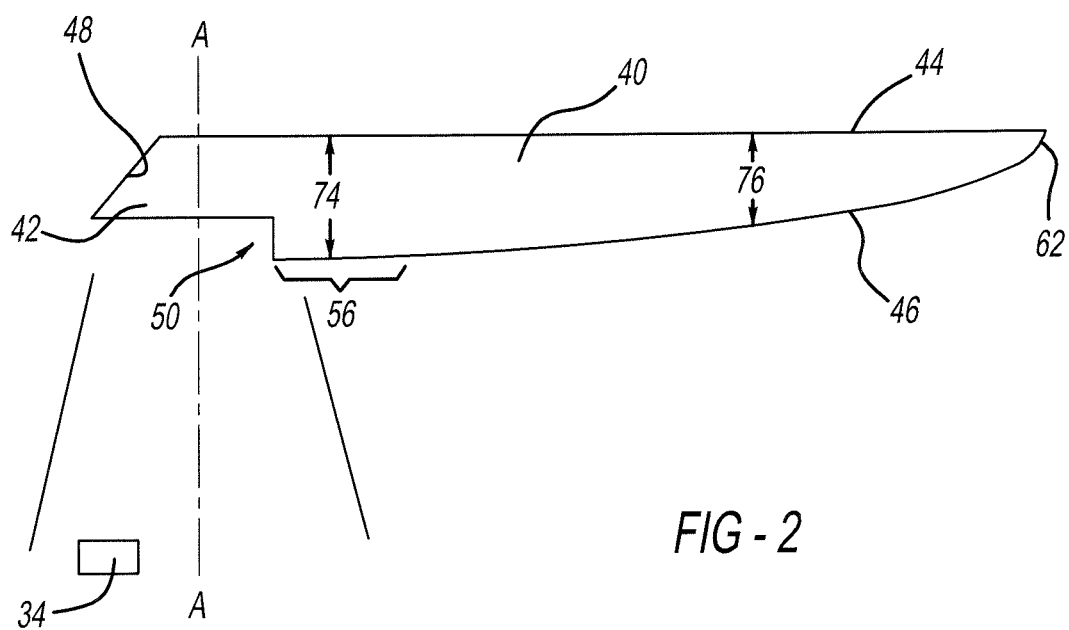
FIG. 2 is a side view of a pointer arm made in accordance with the present invention.

Referring now to FIG. 1, there is provided a dashboard generally shown at 10 for a motor vehicle. The dashboard 10 includes an instrument panel 12 that includes a plurality of gauges 14 and dials 16. The gauges 14 communicate information indicative of vehicle operating parameters to vehicle operator. A pointer assembly generally indicated at 18 is included for the gauge 14 that rotates about an axis A-A to point to a specific portion of the graphics provided in each of the gauges 14 to indicate a current value of an operating condition.

Figure 3:
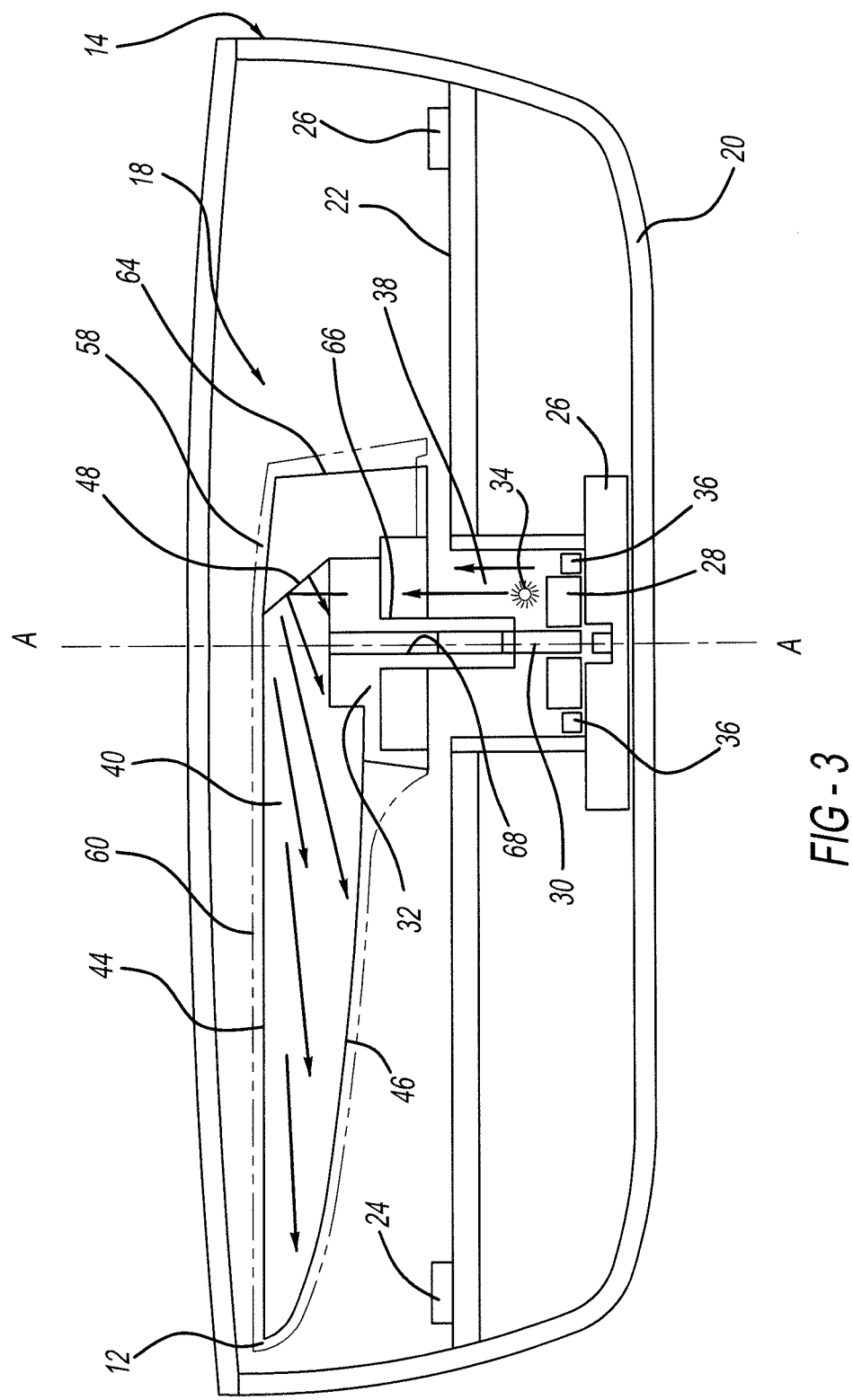
FIG. 3 is a cross-section of an example pointer assembly showing the arm of FIG. 2 in the operating environment of a gauge assembly.

Referring now to FIG. 3, gauge assembly 14 includes a housing 20 that supports a gauge surface 22 with graphics 24. A printed circuit board 26 supports a stepper motor 28 that drives a shaft 30. The shaft 30 maybe a clear shaft or a shaft including a central opening through which light may propagate upwardly into the pointer assembly 18.

A shroud 32 is supported on the shaft 30. A light source 34 is supported on the printed circuit board 26 along an axis A-A. The light source 34 propagates light upward into the pointer assembly 18 along the axis A-A. Other light sources 36 may optionally be provided on the printed circuit board 26 if desired for a particular application as will be appreciated by those skilled in the art. The light source 34 along the axis A may be utilized to direct light along the axis A-A. The light sources 36 may also be utilized that are disposed around the axis A-A within the light housing 38 to direct light upward into the pointer assembly 18, if required depending on the final design of the gauge 14.

The pointer assembly 18 includes a pointer 40 that includes a base 42 disposed about the axis A-A and arm portion 44. In a preferred embodiment, the shaft 30 is clear such that shaft 30 will also propagate light from the light source 34 upward into the pointer 40. In a preferred embodiment, the light source 34 is a light emitting diode, however, other light sources as are known by those skilled in the art are also used in the present invention.

The pointer 40 includes a first illuminated viewing surface 44, a second bottom surface 46 and an angled reflecting surface 48. The reflecting surface 48 for reflects light received from illuminating source 34 into the length of said pointer arm 18.

Figure 4:
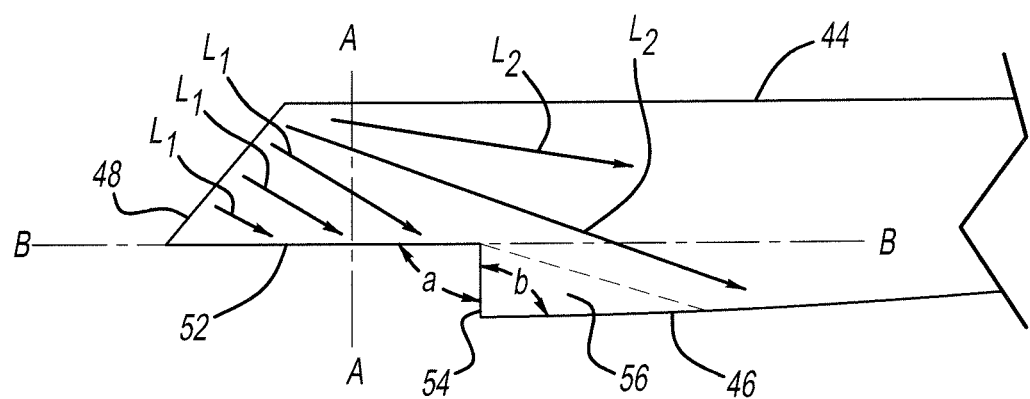
FIG. 4 is an enlarged cross-section of the pointer assembly of FIG. 2.
Figure 5:
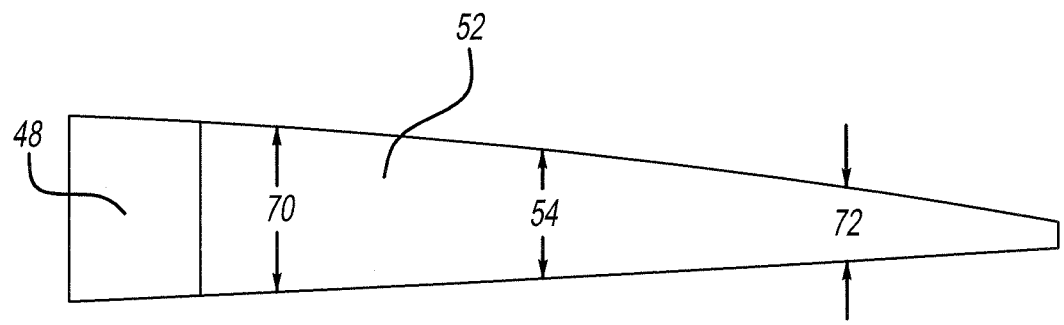
FIG. 5 is a bottom view of a pointer arm of FIG. 2.

A step portion generally shown at 50 is provided on the bottom of the pointer and adjacent to second bottom surface 46 which extends from the second bottom surface 46 toward the first illuminated surface 44 and which interferes at least in part with the reflected light path from the reflecting surface 48 to the second surface 46. This is shown best in FIG. 4, wherein the light reflected L1 is substantially attenuated by first step surface 52 and second step surface 54 which produces a light diminished area 56 along the surface 46. Thus, the step portion 50 includes a first step surface 52 which is substantially normal to an axis of rotation (A-A) of said pointer and a second angled surface 54 at an angle 'c' of about 90 degrees to said first surface 52. While in a preferred embodiment, the second surface is at an angle of about 90 degrees, it will be readily appreciated that the surface can be used at any angle which effectively blocks or reduces at least a portion of the light to a "shaded" portion 56 of the pointer arm 14 along the second bottom surface 46. The shaded portion 56 may be generally from about 1% to about 85% and typically 5% to about 60% with a preferred range of 10% to about 40% of the length of the surface 46 depending on the design configurations of the pointer and the desired result. In any case, this step arrangement reduces the propensity for there to be a "hot" spot of light near the axis A-A in the visible illuminated surface 44. This allows the lighting along the pointer 14 to be consistent. It is readily appreciated that the angle 'b' between the surface 54 and surface 46 is positive and less than 90 degrees. As stated above, in a preferred embodiment, the bottom surface tapers toward the line B-B normal to the rotation of the pointer 14.

It should be readily appreciated that the pointer and be used independently in a gauge in many mounted configurations without deviating from the scope or the present invention. However, in a typical embodiment, an optional cap 58 is disposed over the base 42 of the pointer 40 eliminate a possible viewable bright spot of the pointer 40. The cap 58 includes an arm portion 60 that extends toward the tip 62. A counterweight 64 is supported by the shroud 32 under the cap 58. The shroud 32 includes a shroud stem 66 that includes a central opening 68 along the axis A-A that receives the shaft 30. The pointer arm 24 includes a first width 70 disposed near the base and tapers to a second width 72 near the tip 36 and a first height 74 which tapers to a second height 76 near the tip 62.

As will be readily appreciated by those practicing the present invention, the stepped portion of the pointer of the present invention substantially provides a uniform luminance in pointers that include large differences in thickness between the hub and tip and may be adapted to other designs as well where eliminating a portion of the light near the axis of the pointer is desired.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A gauge assembly comprising:
a gauge surface including graphics representing a vehicle operating parameter;
a pointer supported for movement about an axis to indicate a current condition of the vehicle operating parameter by pointing to a specific location on the gauge surface, said pointer including a pointer arm extending away from a hub;
an illumination source for illuminating said pointer arm; and
said pointer arm including a reflecting surface for reflecting light received from said illuminating source into the length of said pointer arm; said pointer arm also including a first illuminated viewing surface and a second surface to which light from said reflecting surface is at least partially reflected, the second surface including a step portion in an operative portion of the second surface for reducing light received by said second surface adjacent the step portion and providing an overall even light throughout the operative illuminated viewing surface.

2. The gauge assembly of claim 1 wherein the step portion includes a first surface which is substantially normal to an axis of rotation of said pointer and a second angled surface at an angle of about 90 degrees to said first surface, wherein said second surface is at an angle which blocks at least a portion of the light to the second surface.

3. The gauge assembly of claim 2 wherein said second surface is at an angle of about 90 degrees to said first surface.

4. The gauge assembly as recited in claim 2 wherein the bottom surface tapers at an angle of less than 90 degrees to said second surface toward the plane normal to the axis in a direction away from the reduced light created by said step.

5. The gauge assembly as recited in claim 4 wherein the pointer arm includes a first height proximate the step portion and tapers to a second height less than the first height in a direction toward the tip.

6. The gauge assembly of claim 2 wherein the amount of the second angled surface reduces light to said second surface of said pointer from 10% to 100% of the length of the second surface.

7. The gauge assembly of claim 2 wherein said illuminated viewing surface and said second surface converge toward one another in a direction toward said point.

8. The gauge assembly as recited in claim 2 wherein said second surface tapers toward the plane normal to the axis in a direction away from the reduced light created by said step.

9. The gauge assembly of claim 1 wherein the start of the illuminated surface is closer to the axis of rotation than a comparative pointer not including the stepped portion.

10. The gauge assembly as recited in claim 1 wherein the pointer arm includes a tip spaced apart from the hub, and the bottom surface includes a positive slope proximate the tip.

11. An illuminated pointer assembly comprising:
a pointer operative for being supported in a vehicle gauge for movement about an axis to indicate a current condition of a vehicle operating parameter by pointing to a specific location on the gauge surface, said pointer including a pointer arm extending away from a hub;
an illumination source for illuminating said pointer arm;
said pointer arm including a reflecting surface for reflecting light received from said illuminating source into the length of said pointer arm; said pointer arm also including a first illuminated viewing surface and a second surface to which light from said reflecting surface is at least partially reflected, the second surface including a step portion in an operative portion of the second surface for reducing light received by said second surface adjacent the step portion and providing an overall even light throughout the operative illuminated viewing surface.

12. The gauge assembly of claim 11 wherein the step portion includes a first surface which is substantially normal to an axis of rotation of said pointer and a second angled surface at an angle of about 90 degrees to said first surface, wherein said second surface is at an angle which blocks at least a portion of the light to the second surface.

13. The gauge assembly of claim 12 wherein said second surface is at an angle of about 90 degrees to said first surface.

14. The gauge assembly as recited in claim 12 wherein the bottom surface tapers at an angle of less than 90 degrees to said second surface toward the plane normal to the axis in a direction away from the reduced light created by said step.

15. The gauge assembly as recited in claim 14 wherein the pointer arm includes a first height proximate the step portion and tapers to a second height less than the first height in a direction toward the tip.

16. The gauge assembly of claim 12 wherein the amount of the second angled surface reduces light to said second surface of said pointer from 10% to 100% of the length of the second surface.

17. The gauge assembly of claim 12 wherein said illuminated viewing surface and said second surface converge toward one another in a direction toward said point.

18. The gauge assembly as recited in claim 12 wherein said illuminated viewing surface and said second surface converge toward one another in a direction toward said point.

19. The gauge assembly of claim 11 wherein the start of the illuminated surface is closer to the axis of rotation than a comparative pointer not including the stepped portion.

20. The gauge assembly as recited in claim 11 wherein the pointer arm includes a tip spaced apart from the hub, and the bottom surface includes a positive slope proximate the tip.

21. A gauge assembly comprising:
a gauge surface including graphics representing a vehicle operating parameter;
a pointer supported for movement about an axis to indicate a current condition of the vehicle operating parameter by pointing to a specific location on the gauge surface, said pointer including a pointer arm extending away from a hub;
an illumination source for illuminating said pointer arm;
said pointer arm including a reflecting surface for reflecting light received from said illuminating source into the length of said pointer arm; said pointer arm also including a first illuminated viewing surface and a second surface to which light from said reflecting surface is at least partially reflected, the second surface including a step portion in an operative portion of the second surface for reducing light received by said second surface adjacent the step portion and providing an overall even light throughout the operative illuminated viewing surface;
said step portion including a first surface which is substantially normal to an axis of rotation of said pointer and a second angled surface at an angle which blocks at least a portion of the light to the second surface such that it provides a start of an illuminated surface closer to the axis of rotation than a comparative pointer not including the stepped portion.

22. The gauge assembly of claim 21 wherein said angle between said first surface and said second surface of said step portion is about 90 degrees.

23. The gauge assembly of claim 21 where in the angle between said second surface of said stepped portion and said second surface of said arm is a positive angle of 90 degrees or less.

* * * * *